(12) United States Patent
Letang et al.

(10) Patent No.: US 9,665,097 B2
(45) Date of Patent: May 30, 2017

(54) AIRCRAFT GROUND LIFT DUMP FLIGHT CONTROL FUNCTION

(71) Applicant: Bombardier Inc., Dorval (CA)

(72) Inventors: Antoine Letang, Montreal (CA); Florian Chedaleux, Montreal (CA); Vincent Poudou, Montreal (CA); Lawrence Oberfeld, Montreal (CA); Eric Palmer, Woodinville, WA (US)

(73) Assignee: BOMBARDIER INC., Dorval (CA)

( * ) Notice: Subject to any disclaimer, the term of this patent is extended or adjusted under 35 U.S.C. 154(b) by 0 days.

(21) Appl. No.: 14/896,983

(22) PCT Filed: Jun. 11, 2014

(86) PCT No.: PCT/IB2014/001031
§ 371 (c)(1),
(2) Date: Dec. 9, 2015

(87) PCT Pub. No.: WO2014/199217
PCT Pub. Date: Dec. 18, 2014

(65) Prior Publication Data
US 2016/0139597 A1   May 19, 2016

Related U.S. Application Data

(60) Provisional application No. 61/835,184, filed on Jun. 14, 2013.

(51) Int. Cl.
*G01C 23/00* (2006.01)
*G05D 1/00* (2006.01)
(Continued)

(52) U.S. Cl.
CPC ............ *G05D 1/0061* (2013.01); *B64C 13/12* (2013.01); *B64C 13/22* (2013.01); *B64C 13/503* (2013.01)

(58) Field of Classification Search
CPC ....... B64C 13/22; B64C 13/12; B64C 13/503; G05D 1/0061
(Continued)

(56) References Cited

U.S. PATENT DOCUMENTS 3,618,880 A   11/1971   Hagaman et al.
6,206,329 B1 *   3/2001   Gautier .................. B64C 13/42
244/221

(Continued)

FOREIGN PATENT DOCUMENTS

| CN | 102422017 A | 4/2012 |
| CN | 102745326 B | 10/2015 |
| EP | 1310848 | 5/2003 |

OTHER PUBLICATIONS

PCT international Search Report and Written Opinion dated Nov. 19, 2014 re: International Application No. PCT/IB2014/001031.
(Continued)

*Primary Examiner* — Gertrude Arthur Jeanglaud
(74) *Attorney, Agent, or Firm* — Norton Rose Fulbright Canada LLP

(57) ABSTRACT

A flight control system for an aircraft includes at least one flight control computer that carries out a ground lift dump function that selectively extends a spoiler located on a wing of the aircraft into an airflow passing over the wing. The at least one flight control computer includes arming logic that is responsive to an input signal indicative of an aircraft parameter to automatically arm the ground lift dump function during certain phases of operation of the aircraft. The at least one flight control computer includes spoiler deployment logic that is responsive to an arming signal from the aiming logic which indicates that the ground lift function is armed to deploy the spoiler into its extended position within the airflow passing over the wing of the aircraft to assist in stopping the aircraft while the aircraft is on the ground.

32 Claims, 4 Drawing Sheets

(51) Int. Cl.
*B64C 13/22* (2006.01)
*B64C 13/50* (2006.01)
*B64C 13/12* (2006.01)

(58) Field of Classification Search
USPC ........ 701/3, 13, 14, 36; 244/158.1, 164, 213
See application file for complete search history.

(56) References Cited

U.S. PATENT DOCUMENTS

| | | |
|---|---|---|
| 6,860,452 B2 * | 3/2005 | Bacon .................. G05D 1/0077 244/194 |
| 8,757,557 B2 | 6/2014 | Brewer et al. |
| 2012/0134802 A1 | 5/2012 | Westergaard et al. |

OTHER PUBLICATIONS

The State Intellectual Property Office of the People's Republic of China; Notification of First Office Action dated Jul. 27, 2016 re: Application No. 201480033146.4.
English translation of Chinese patent document No. CN 102745326 dated Oct. 7, 2015; www.google.ca/patents . . . .
English translation of Chinese patent document No. CN 102422017 dated Apr. 18, 2012; www.google.ca/patents . . . .
The State Intellectual Property Office of the People's Republic of China; Notification of First Office Action dated Mar. 10, 2017 re: Application No. 201480033146.4.

* cited by examiner

AIRCRAFT GROUND LIFT DUMP FLIGHT CONTROL FUNCTION

CROSS REFERENCE TO RELATED APPLICATION AND CLAIM OF PRIORITY

This application is a national phase application under 35 U.S.C. 371 of International Patent Application No. PCT/IB2014/001031 filed on Jun. 11, 2014, which claims priority from U.S. provisional patent application no. 61/835,184 filed on Jun. 14, 2013, the entire contents of which are hereby incorporated by reference.

FIELD OF THE INVENTION

The present invention relates in general to a flight control system for aircraft, and in particular to an aircraft flight control system that allows for the automatic arming of a ground lift dump function within the flight control system that, when activated, achieves improved, safer braking or stopping performance of the aircraft.

BACKGROUND OF THE INVENTION

A ground lift dump function within an aircraft flight control system is known. This function generally involves the control of the movement of some or all of the plurality of "spoiler" flight control surfaces located on the top surfaces of the wings of an aircraft during certain phases of aircraft flight. The movement typically involves some or all of the spoilers being fully extended or deployed into a position within the airflow passing over the aircraft wings. The deployed spoilers significantly reduce the lift of the wing section located aft of the spoilers (as well as increasing or augmenting the drag on the wings of the aircraft). This generally occurs when the aircraft is on the ground after being in-flight or is on the ground during an aircraft takeoff condition that has been rejected and the pilot must stop the plane before ever taking off. In either critical flight phase, the deployment of the spoilers slows the aircraft, thereby assisting with the braking of the aircraft. More particularly, the ground lift dump function helps to keep the wheels of the landing gear in contact with the ground, thereby improving the braking efficiency of the aircraft. The ground lift dump function thus helps the pilot to achieve a more controlled stopping of the aircraft.

Modern aircraft typically have a pair of ground spoilers (one on the top surface of each wing) that may be located "inboard" (i.e., relatively close to the aircraft fuselage) on each wing. These ground spoilers usually function only to assist with the stopping of the aircraft. As such, they generally have only two positions: fully retracted during normal in-flight aircraft operation, and fully extended or deployed while the plane is on the ground to assist with stopping the aircraft.

These modern aircraft may also have one or more multi-function spoilers located on the top surface of each wing, for example, at the mid-span point or more outboard on the wing. These spoilers may also be used similar to the ground spoilers to help stop the aircraft while it is on the ground after aircraft flight or after a rejected takeoff. As such, each multi-function spoiler is commanded to its fully extended or deployed position, similar to the ground spoilers. This may also allow the pilot to start placing a drag condition on the aircraft while the aircraft is still in-flight and prior to landing.

However, in contrast to the ground spoilers which have only two operating positions (e.g., fully retracted and fully deployed), the multi-function spoilers are also operable at a multitude of "controlled angle" positions in between the fully extended and deployed positions. This allows the multi-function spoilers to assist the pilot with the control of the roll of the aircraft. When used to control the aircraft roll, the multi-function spoilers may be deployed asymmetrically. The aircraft roll control using the multi-function spoilers may be accomplished either manually by the pilot or co-pilot or automatically by the aircraft flight control system when the autopilot is engaged.

Typically, the multi-function spoilers are manually commanded to move by the pilot or co-pilot using a control lever located in a center console of the cockpit or by the pilot or co-pilot using his/her sidestick or yoke controller. Usually, the position of each multifunction spoiler is proportional to the manual command given by the pilots. Also, in the ground lift dump function typically the ground spoilers both move in tandem when commanded and all of the multi-function spoilers move together in the same amount. In the ground lift dump function, it is generally desirable to avoid an "asymmetric" spoiler deployment condition in which one of the spoilers on one wing is deployed but the opposing or "mating" spoiler on the other wing does not deploy. This could cause a dangerous condition for the aircraft.

Thus, the ground lift dump function within an aircraft flight control, whether a modern "fly-by-wire" type of flight control system or a more traditional mechanical or hydro-mechanical type of flight control system, must function during critical phases of flight. As such, the ground lift dump function ideally should be designed to meet relatively tight safety requirements.

It is known that the ground lift function within an aircraft flight control system is typically armed for activation prior to deployment of the spoilers. The arming is usually performed by the pilot or co-pilot, and it is known to be carried out manually, for example, by one of the pilots activating a button or a lever at a certain point in time during aircraft flight (e.g., just prior to landing). Conversely, the ground lift function is typically disarmed during other flight phases (e.g., the taxi or parking phases). This type of manual arming increases the workload of the pilots and, as such, may lead to procedural errors. For example, if the pilot fails to properly arm the ground lift function at a particular time, there could be a risk that the deployment of the spoilers may not occur in time or may not occur at all. This could lead to dangerous and even catastrophic effects for the aircraft.

What is needed is an improved ground lift dump function within an aircraft flight control system in which the arming of the function is performed automatically, thereby eliminating the risks associated with the manual arming of the ground lift dump function by the pilots mentioned hereinabove.

SUMMARY OF THE INVENTION

According to an embodiment of the present invention, a flight control system for an aircraft includes at least one flight control computer that carries out a ground lift dump function that selectively extends a spoiler located on a wing of the aircraft into an airflow passing over the wing. The at least one flight control computer includes arming logic that is responsive to an input signal indicative of an aircraft parameter to automatically arm the ground lift dump function during certain phases of operation of the aircraft. The at least one flight control computer includes spoiler deployment logic that is responsive to an arming signal from the arming logic which indicates that the ground lift function is armed to deploy the spoiler into its extended position within the airflow passing over the wing of the aircraft to assist in stopping the aircraft while the aircraft is on the ground.

In an advantageous embodiment of the present invention, the spoiler comprises at least one of a ground spoiler and a multi-function spoiler.

In an advantageous embodiment of the present invention, the certain phases of aircraft operation in which the ground lift dump function is automatically armed includes an on the ground phase after the aircraft has been in a flight phase.

In an advantageous embodiment of the present invention, the certain phases of aircraft operation in which the ground lift dump function is automatically armed includes a takeoff condition of the aircraft such that the spoiler can be deployed into its extended position to assist in stopping the aircraft if the takeoff has been terminated prior to the aircraft taking off.

In an advantageous embodiment of the present invention, the at least one flight control computer includes arming logic that is responsive to an input signal indicative of the aircraft parameter to automatically disarm the ground lift dump function during certain phases of aircraft operation.

In an advantageous embodiment of the present invention, the certain phases of aircraft operation in which the ground lift dump function is automatically disarmed includes a taxi phase.

In an advantageous embodiment of the present invention, the certain phases of aircraft operation in which the ground lift dump function is automatically disarmed includes a park phase.

In an advantageous embodiment of the present invention, the spoiler deployment logic is also responsive to a signal from a lever in a cockpit in the aircraft, wherein the lever is movable by a pilot in the cockpit.

In an advantageous embodiment of the present invention, the spoiler deployment logic is responsive to the signal from the lever in the cockpit when the ground lift function is armed to move the spoiler into a position that is proportional to the amount of movement of the lever by the pilot in the cockpit, thereby affecting the amount of lift and drag on the wing of the aircraft.

In an advantageous embodiment of the present invention, the flight control computer comprises a portion of a fly-by-wire type of flight control system for the aircraft.

In an advantageous embodiment of the present invention, the input signal comprises at least one of an aircraft altitude signal indicative of the height of the aircraft above ground, a weight on wheel signal indicative of a weight of the aircraft, and a wheel speed signal indicative of a speed of one or more wheels of the aircraft.

In an advantageous embodiment of the present invention, the input signal comprises an aircraft altitude signal indicative of the height of the aircraft above ground, a weight on wheel signal indicative of a weight of the aircraft, and a wheel speed signal indicative of a speed of one or more wheels of the aircraft; and when the aircraft altitude signal is invalid and the weight on wheel signal does not give an indication of the weight of the aircraft, the spoiler deployment logic is operable to deploy the spoiler located on the wing in response to the wheel speed signal having a predetermined characteristic.

According to another embodiment of the present invention, a method is disclosed for implementing a ground lift dump function within a flight control system for an aircraft. The method includes the step of checking if the aircraft is in a taxi phase or a park phase and if so, then automatically disarming the ground lift dump function. The method also includes the step of checking if the aircraft is in one of a takeoff phase and in an in-flight phase and if so, then automatically arming the ground lift dump function.

In an advantageous embodiment of the present invention, the method also includes the steps of wherein the step of automatically arming the ground lift dump function is based on at least one of an aircraft altitude signal indicative of the height of the aircraft above ground, a weight on wheel signal indicative of a weight of the aircraft, and a wheel speed signal indicative of a speed of one or more wheels of the aircraft.

In an advantageous embodiment of the present invention, the method also includes the steps of when the aircraft altitude signal is invalid and the weight on wheel signal does not give an indication of the weight of the aircraft, deploying a spoiler located on a wing of the aircraft in response to the wheel speed signal having a predetermined characteristic.

In an advantageous embodiment of the present invention, the method also includes the steps of checking if a thrust command is in an idle condition and at least one main landing gear on the aircraft is on the ground and if so, then activating at least two ground lift spoilers on the aircraft into a fully deployed condition.

In an advantageous embodiment of the present invention, the method also includes the steps of checking if both of the main landing gears on the aircraft are on the ground and if so, then activating the at least two ground spoilers into the fully deployed condition and also activating at least some of a plurality of multi-function spoilers into a fully deployed condition.

In an advantageous embodiment of the present invention, the method also includes the steps of if a result of the checking if the aircraft is in a takeoff phase or in an in-flight phase indicates that the aircraft is not in a takeoff phase or is not in an in-flight phase, then the method branching back to the step of checking if the aircraft is in a taxi phase or a park phase.

In an advantageous embodiment of the present invention, the method also includes the steps of after automatically arming the ground lift dump function the method branches back to the step of checking if the aircraft is in a taxi phase or a park phase.

In an advantageous embodiment of the present invention, the method also includes the steps of if a result of the checking if a thrust command is in an idle condition and at least one main landing gear on the aircraft is on the ground indicates that the thrust command is not in an idle condition and that the at least one main landing gear is not on the ground, then the method branching back to the step of checking if a thrust command is in an idle condition and at least one main landing gear on the aircraft is on the ground.

In an advantageous embodiment of the present invention, the method also includes the steps of if as a result of the step of checking if both of the main landing gears on the aircraft are on the ground indicates that both of the main landing gears are not on the ground, then the method branching back to the step of checking if the aircraft is in a taxi phase or a park phase.

In an advantageous embodiment of the present invention, the method also includes the steps of after the step of activating the at least two ground spoilers into the fully deployed condition and also activating at least some of a plurality of multi-function spoilers into a fully deployed condition, the method branching back to the step of checking if the aircraft is in a taxi phase or a park phase.

According to yet another embodiment of the present invention, a computer program product is disclosed for implementing a ground lift dump function with an aircraft flight control system, the computer program product comprising a non-transitory computer readable storage medium having program code embodied therewith, the program code readable/executable by a computer, processor or logic circuit to perform a method including checking if the aircraft is in a taxi phase or a park phase and if so, then automatically disarming the ground lift dump function; and checking if the aircraft is in one of a takeoff phase and in an in-flight phase and if so, then automatically arming the ground lift dump function.

In an advantageous embodiment of the present invention, the method also includes the steps of wherein the step of automatically arming the ground lift dump function is based on at least one of an aircraft altitude signal indicative of the height of the aircraft above ground, a weight on wheel signal indicative of a weight of the aircraft, and a wheel speed signal indicative of a speed of one or more wheels of the aircraft.

In an advantageous embodiment of the present invention, the method also includes the steps of when the aircraft altitude signal is invalid and the weight on wheel signal does not give an indication of the weight of the aircraft, deploying a spoiler located on a wing of the aircraft in response to the wheel speed signal having a predetermined characteristic.

In an advantageous embodiment of the present invention, the method also includes the steps of checking if a thrust command is in an idle condition and at least one main landing gear on the aircraft is on the ground and if so, then activating at least two ground lift spoilers on the aircraft into a fully deployed condition.

In an advantageous embodiment of the present invention, the method also includes the steps of checking if both of the main landing gears on the aircraft are on the ground and if so, then activating the at least two ground spoilers into the fully deployed condition and also activating at least some of a plurality of multi-function spoilers into a fully deployed condition.

In an advantageous embodiment of the present invention, the method also includes the steps of if a result of the checking if the aircraft is in a takeoff phase or in an in-flight phase indicates that the aircraft is not in a takeoff phase or is not in an in-flight phase, then the method branching back to the step of checking if the aircraft is in a taxi phase or a park phase.

In an advantageous embodiment of the present invention, the method also includes the steps of after automatically arming the ground lift dump function the method branches back to the step of checking if the aircraft is in a taxi phase or a park phase.

In an advantageous embodiment of the present invention, the method also includes the steps of if a result of the checking if a thrust command is in an idle condition and at least one main landing gear on the aircraft is on the ground indicates that the thrust command is not in an idle condition and that the at least one main landing gear is not on the ground, then the method branching back to the step of checking if a thrust command is in an idle condition and at least one main landing gear on the aircraft is on the ground.

In an advantageous embodiment of the present invention, the method also includes the steps of if as a result of the step of checking if both of the main landing gears on the aircraft are on the ground indicates that both of the main landing gears are not on the ground, then the method branching back to the step of checking if the aircraft is in a taxi phase or a park phase.

In an advantageous embodiment of the present invention, the method also includes the steps of after the step of activating the at least two ground spoilers into the fully deployed condition and also activating at least some of a plurality of multi-function spoilers into a fully deployed condition, the method branching back to the step of checking if the aircraft is in a taxi phase or a park phase.

Embodiments of the present invention provide for the fully automatic arming and disarming of the ground lift dump function within an aircraft flight control system at the appropriate times during the flight envelope, thereby providing for improved activation and deactivation of the spoilers that provide the ground lift function on the aircraft.

Advantages of embodiments of the present invention include a relative reduction in the workload of the pilots in not having to manually arm and disarm the ground lift function within the flight control system of an aircraft, wherein the arming and disarming functions are now performed automatically by the ground lift dump function logic within the aircraft flight control system. Further advantages of not having the pilots manually arm and disarm the ground lift function include reducing the possibility of pilot procedural error if the pilots were to fail to arm and/or disarm the ground lift function or to do so at the wrong time during the aircraft flight envelope.

BRIEF DESCRIPTION OF THE DRAWINGS

The various embodiments of the present invention can be understood with reference to the following drawings. The components are not necessarily to scale. Also, in the drawings, like reference numerals designate corresponding parts throughout the several views.

DETAILED DESCRIPTION OF THE INVENTION

The present invention is more particularly described in the following description and examples that are intended to be illustrative only since numerous modifications and variations therein will be apparent to those skilled in the art. As used in the specification and in the claims, the singular form "a," "an," and "the" may include plural referents unless the context clearly dictates otherwise. Also, as used in the specification and in the claims, the term "comprising" may include the embodiments "consisting of" and "consisting essentially of" Furthermore, all ranges disclosed herein are inclusive of the endpoints and are independently combinable.

As used herein, approximating language may be applied to modify any quantitative representation that may vary without resulting in a change in the basic function to which it is related. Accordingly, a value modified by a term or terms, such as "about" and "substantially," may not to be limited to the precise value specified, in some cases. In at least some instances, the approximating language may correspond to the precision of an instrument for measuring the value.

In embodiments of the present invention, a flight control system for an aircraft includes ground lift dump functional logic that provides for automatic arming and disarming of the activation and deactivation of various spoilers located on the wings of the aircraft that, when activated, provide the ground lift dump function of the aircraft in assisting with the braking or stopping of the aircraft on the runway.

The foregoing and other features of various disclosed embodiments of the invention will be more readily apparent from the following detailed description and drawings of the illustrative embodiments of the invention wherein like reference numbers refer to similar elements.

Figure 1:
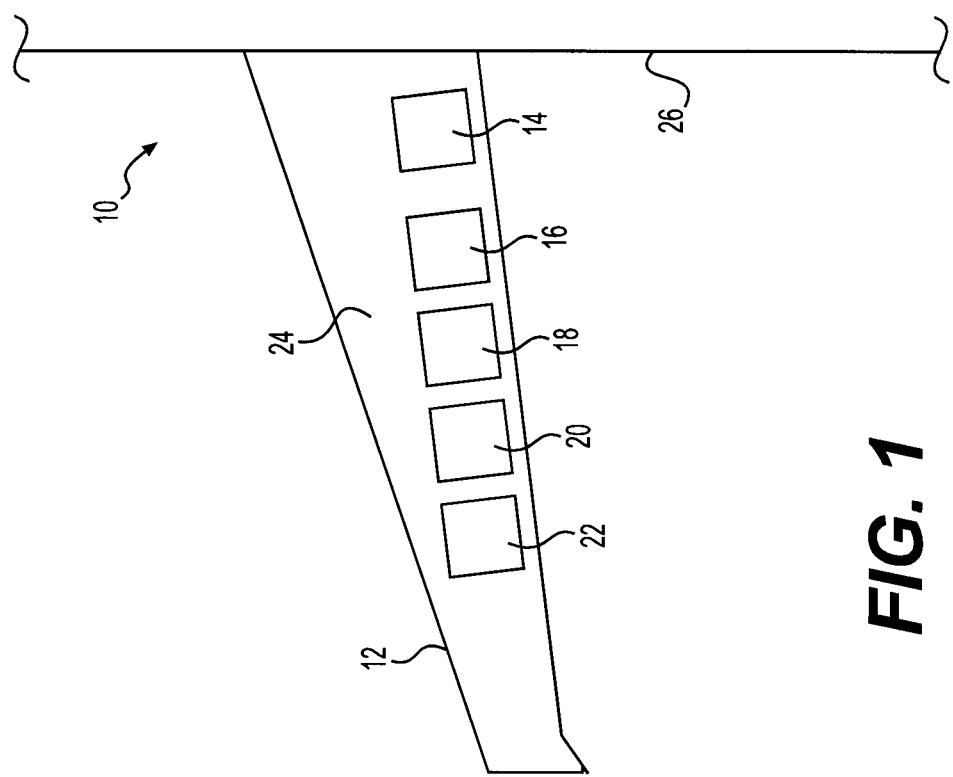
FIG. 1 is a partial top view of an aircraft illustrating one of the wings having a ground spoiler and four multi-function spoilers that are controlled in a ground lift function by an aircraft flight control system in accordance with embodiments of the present invention.

Referring to FIG. 1, there illustrated is a partial top view of an aircraft 10 showing one of the wings 12 (i.e., the left wing 12) having a ground spoiler 14 and four multi-function spoilers 16-22 all located on a top surface 24 of the wing 12. The spoilers 14-22 are surfaces whose angular positions with respect to the top surface 24 of the wing 12 are controlled in ground lift function logic located within an aircraft flight control system in accordance with embodiments of the present invention. Although not shown, it should be understood that the other wing 12 (i.e., the right wing 12) of the aircraft 10 has a "mirror image" arrangement of the single ground spoiler 14 and the four multi-function spoilers 16-22. Also, FIG. 1 shows a single ground spoiler 14 per wing 12, with the ground spoiler 14 being located at an inboard location on the wing 12 (i.e., closest to the fuselage 26 of the aircraft 10). However, more than one ground spoiler 14 per wing 12 may be utilized in embodiments of the present invention. Also, FIG. 1 shows four multi-function spoilers 16-22 per wing 12 and located approximately mid-span on the wing 12. However, fewer or greater than four multi-function spoilers 16-22 may be utilized in embodiments of the present invention, and these spoilers 16-22 may be located in other than the mid-span location on the wing 12. The number of ground spoilers 14 and multi-function spoilers 16-22 utilized typically depends on the amount of stopping or braking ability desired or needed to stop the aircraft when these spoilers 14-22 are all deployed. Only one pair of ground spoilers 14 has relatively limited aircraft braking ability compared to the four pairs of multi-function spoilers 16-22, which provide the majority of the stopping or braking ability of the aircraft 10 when deployed by the ground lift function of embodiments of the present invention.

Although not shown in FIG. 1, the wing 12 of an aircraft 10 typically has other flight control surfaces located thereon, such as ailerons, slats and/or flaps—none of which are part of embodiments of the present invention.

As described in more detail hereinabove in the BACKGROUND OF THE INVENTION section, the ground spoilers 14 typically operate in either of two positions; a first position where the spoilers 14 are retracted or stowed within the wing 14 or are even with the top surface 24 of the wing 12 such that the spoilers 14 have no effect on the airflow passing over the top surface 24 of the wing 12; and a second position where the spoilers 14 are fully extended upwardly above the top surface 24 of the wing 12 such that they affect the airflow passing over the top surface 24 of the wing 12 so as to cause a reduction in the amount of lift provided by the wing 12 and an increase in the drag provided on the aircraft 10. The two ground spoilers 14 (i.e., one on each wing 12) are typically moved together in tandem into the same positions. This type of symmetric movement is desired, as any asymmetric positioning of the two ground spoiler 14 may result in an unstable and dangerous flight condition for the aircraft 10.

As also described in more detail hereinabove in the BACKGROUND OF THE INVENTION section, the four multi-function spoilers 16-22 typically are positioned in not only the stowed or retracted position and in the fully deployed position, (similar to the ground spoilers 14), to also reduce lift and help stop the aircraft, but they can also be typically set to any position in between to not only reduce lift and increase drag to varying degrees even with the aircraft in-flight (depending on the amount of deployment or extension of the multi-function spoilers 16-22), but also for control of the roll of the aircraft 10 during flight. This is typically accomplished manually by the pilot or co-pilot using his/her sidestick or yoke controller. Usually, the position of each multifunction spoiler 16-22 is proportional to the command given by the pilot using the control lever.

Figure 2:
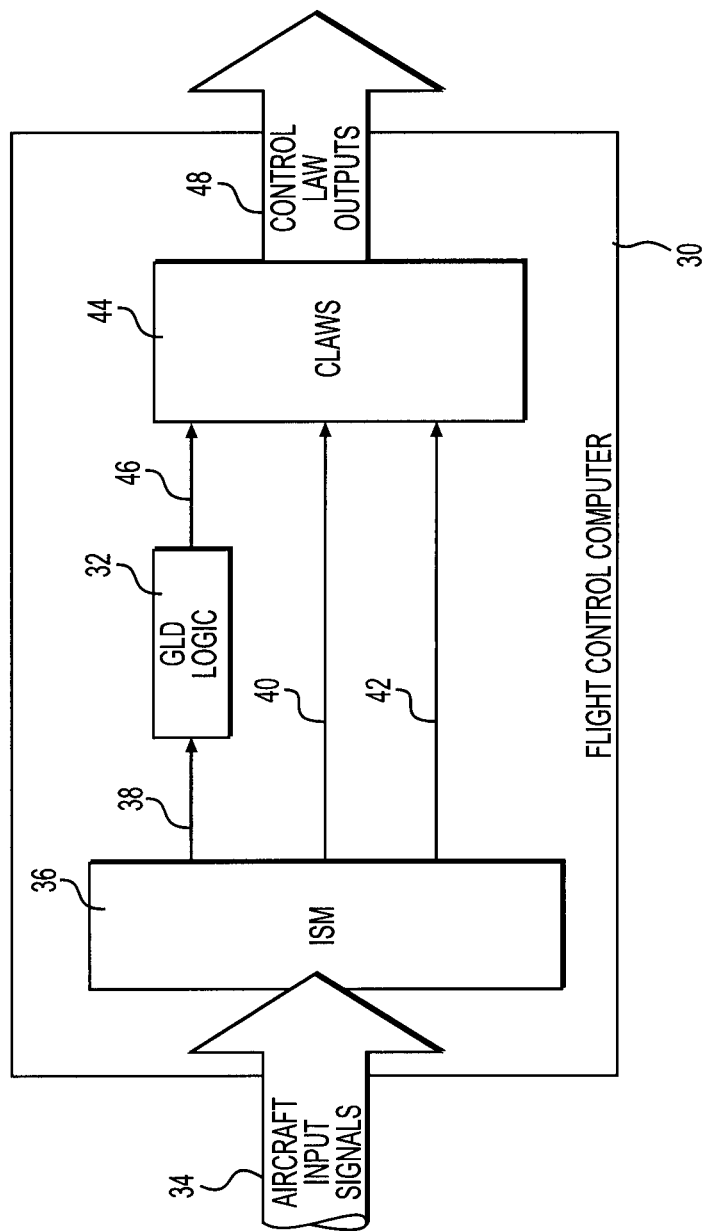
FIG. 2 is a block diagram of a portion of the aircraft flight control system having the ground lift dump function logic in accordance with embodiments of the present invention.

Referring to FIG. 2, there illustrated is a block diagram of a portion of an aircraft flight control system 30 having the ground lift dump function logic 32 embodied therein in accordance with embodiments of the present invention. The flight control system may comprise a fly-by-wire ("FBW") control system in embodiments of the present invention. As such, a FBW flight control system typically comprises a plurality of flight control computers 30, for example, three such computers 30 for redundancy purposes (i.e., in the event that one of the computers 30 fails then one or both of the other two computers 30 can continue to control the aircraft 10). If the ground lift dump function logic 32 is embodied in a FBW flight control system, then that logic 32 may be embodied in software that runs on the flight control computers 30. However, it is to be understood that the GLD logic 32 may be embodied in electrical or electronic hardware, as should be apparent to one of ordinary skill in the art in light of the teachings herein. Also, some type of aircraft flight control system other than a FBW system (e.g., a more traditional mechanical or hydro-mechanical flight control system) may be utilized in embodiments of the present invention. That is, the GLD function logic 32 does not need to be embodied in a FBW type of aircraft flight control system in the broadest embodiments of the present invention. Yet, if the GLD function logic 32 is embodied in a FBW type of aircraft flight control system, the logic 32 should be designed to be consistent with the general and essential principles of segregation and redundancy that are commonly found in such FBW control systems.

For example, the GLD function logic 32 being embodied in a FBW flight control system may be prone to erroneous conditions such as a false "on-ground" signal when the aircraft is in the air, or an annunciated loss of the GLD function while the aircraft is on the ground. The GLD logic 32 should be designed to take these and other erroneous conditions into account and ensure that they do not occur or if they do occur, they do not cause a problem for the aircraft.

FIG. 2 illustrates a plurality of aircraft input signals that may be provided to the flight control computer system 30 on one or more signal busses 34. As is known, the signals on these busses 34 may comprise a large number of signals from various sensors associated with feedback devices and input devices (such as the flight control lever in the cockpit used by the pilots to command the multi-function spoilers 16-22 to desired positions) needed by the flight control computers 30- to properly control the aircraft 10.

The signals on the busses 34 may be provided to an input signal management ("ISM") function block 36 within the flight control computers 30. The ISM function block 36 may be used to condition the aircraft input signals 34 in various ways. For example, the ISM function block 36 may provide enhanced data (e.g., selected, voted, filtered data, etc.) together with associated data validity bits for each of the signals by the ISM 36 on output signal lines 38-42 to various other functions within the flight control computers 30, such as, for example, the GLD logic 32 and the control laws ("CLAWS") function logic 44 within the flight control computers 30. The GLD function logic 32, which is described in more detail hereinafter with respect to FIGS. 3 and 4, may provide its output signals on lines 46 to the CLAWS function logic 44. The CLAWS function logic 44 may provide its output signals on various signal lines or one or more signal busses 48 to other parts of the overall flight control system for the aircraft (e.g., to actuators for the various flight control surfaces on the aircraft 10).

Figure 3:
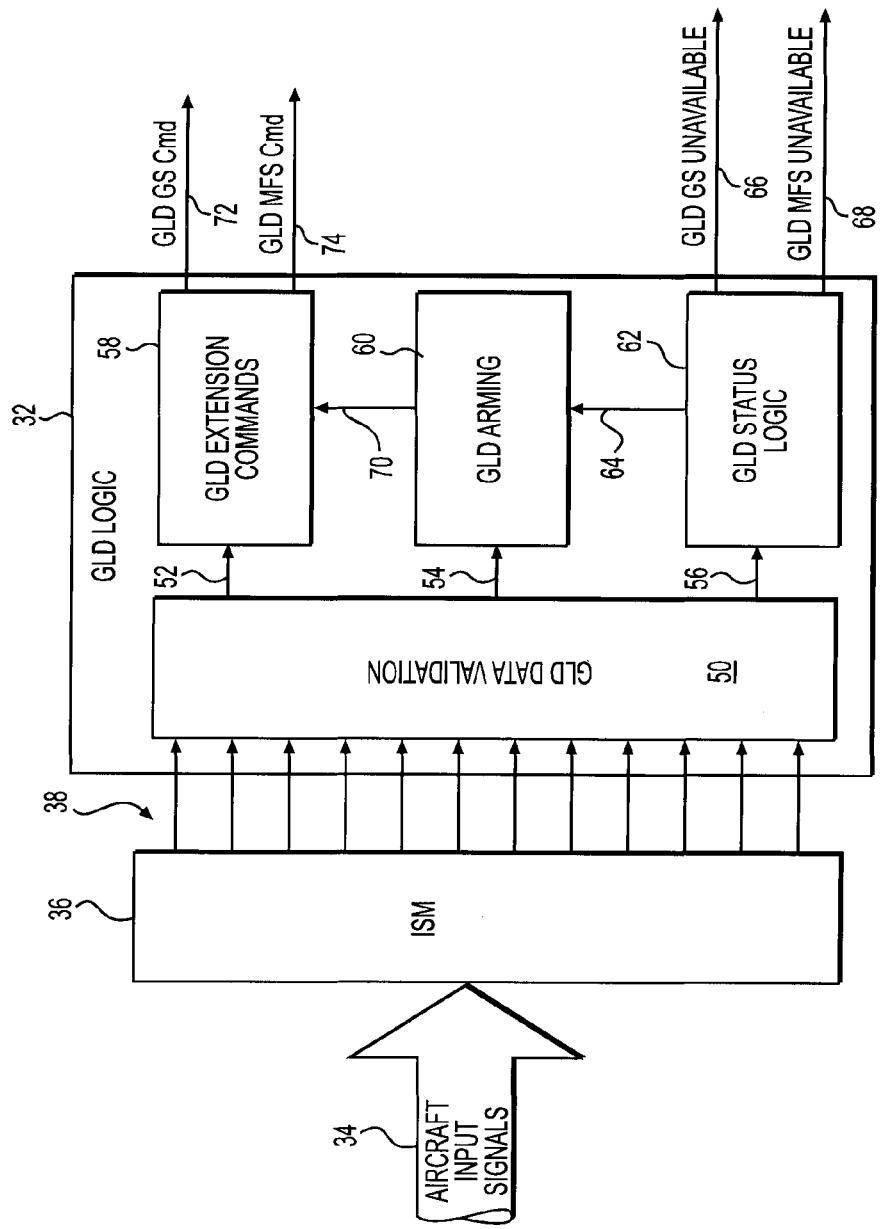
FIG. 3 is a more detailed block diagram of the ground lift dump function logic of FIG. 2 in accordance with embodiments of the present invention.

Referring to FIG. 3, there illustrated are the aircraft input signals 34 and the ISM function logic 36 from FIG. 2. The signals on the lines 38 from the ISM function logic 36 are also shown being provided to the GLD function logic 32. The GLD function logic 32 includes "GLD Data Validation" logic 50 which may be used to define the default values for each of the enhanced data signals 38 from the ISM function logic 36 in the event of the loss of validity of one or more of the ISM output signals 38. The default case may be defined, for example, based on safety effect of the most probable critical combination of failures. The one or more output signals on each of lines or signal busses 52, 54, 56 from the GLD Data Validation logic 50 may be provided, respectively, to "GLD Extension Commands" logic 58, "GLD Arming" logic 60, and "GLD Status Logic" 62.

The GLS Status Logic 62 is also responsive to a signal on a line 64 from the GLD Arming logic 60 and functions to evaluate the capability of the flight control computers 30 to operate the GLD Logic function 32 properly (i.e., to provide the GLD Arming function 60 and the GLD Extension Commands 58 logic). The GLD Status Logic 62 may be based on the availability or validity of the aircraft signals that are used by the GLD Function Logic 32. Specifically, when too many signals 38 are lost, the GLD Logic 32 is no longer able to operate properly, and the GLD Status Logic 62 generates a pair of alerting signals on the lines 66, 68 (i.e., the "GLD GS (Ground Spoiler) Unavailable" signal 66 and the "GLD MFS (Multi-Function Spoiler) Unavailable" signal 68) to annunciation devices seen and/or heard by the pilots in the cockpit.

In general and in accordance with embodiments of the present invention, the GLD Arming logic 60 provides the aircraft flight control system with the ability to automatically detect when the aircraft 10 needs the GLD function 32 to be activated or not. That is, the logic 60 automatically detects when the aircraft 10 is in a flight phase where the aircraft will eventually need to have the ground spoilers 14 and/or the multi-function spoilers 16-22 deployed or activated to the fully extended positions to help stop the aircraft 10 when it is on the ground. This automatic detection of certain aircraft flight conditions to arm the GLD function 32 is in contrast to the prior art where one of the pilots must recognize that the aircraft is in a flight phase or is about to enter a flight phase where the spoilers 14-22 will need to be deployed and the pilot then manually arms the ground lift dump function through use of a switch or lever or some other type of manually operated mechanism.

For example, and in accordance with embodiments of the present invention, the GLD Arming logic 60 automatically arms the GLD function 32 when the aircraft 10 is in its flight phase in preparation for a subsequent landing phase. Also, the GLD Arming logic 60 automatically arms the GLD function 32 at aircraft takeoff in the event that the takeoff must be terminated or rejected for any reason. The GLD function 32 is always armed during these two aircraft flight phases because it is anticipated that aircraft 10 either will be landing after flight or that a takeoff of the aircraft 10 may be terminated. When armed as such, then the spoilers 14-22 can then be activated for extension to assist in stopping the aircraft 10 when it is on the ground.

Further, in accordance with embodiments of the present invention, the GLD Arming logic 60 automatically disarms the GLD function 32 when the aircraft 10 is in a taxi phase already on the ground (e.g., after the aircraft 10 has landed and is then heading towards a gate or other ultimate stopping point). That is, the spoilers 14-22 are not needed to stop the aircraft 10 in the taxi phase of operation. Also the GLD Arming logic 60 automatically disarms the GLD function 32 when the aircraft is in a parking phase. Again, the spoilers 14-22 are not needed in the parking phase to stop the aircraft 10. As such, it is acceptable to disarm the GLD function 32.

In FIG. 3, the GLD Arming logic 60 provides an arming/disarming signal on a line 70 to the GLD Extensions Command logic 58. This logic 70 also uses the signal on the line 52 from the GLD Validation logic 50 to provide the "GLD GS (Ground Spoilers) Cmd" signal on a line 72 to the mechanisms that control the operation (i.e., the position) of the two ground spoilers 14 on the aircraft 10. Similarly, the GLD Extensions Commands logic 58 provides the "GLD MFS (Multi-Function Spoilers) Cmd" signal on a line 74 to the mechanisms that control the operation or positioning of the eight (i.e., four pairs of) multi-function spoilers 16-22 on the aircraft 10.

Referring again to the GLD Arming logic 60 of FIG. 3, as discussed hereinabove, this logic 60 provides the aircraft flight control system with the ability to automatically detect when the aircraft 10 needs the GLD function to be activated or not. The logic 60 does this primarily by detecting the phase of flight that the aircraft 10 is currently in. This is accomplished by providing the GLD Arming logic 60 with a number of aircraft input signals 34, through the ISM 36 and the GLD Data Validation logic 50 and then on the one or more signal lines 54 to the GLD Arming logic 60. The GLD Arming logic 60 utilizes the current status of each of these various aircraft input signals 34 to determine whether the GLD Logic 32 should be armed or not.

For example, and in accordance with various embodiments of the present invention, some of the aircraft input signals 34 that the GLD Arming logic 60 may utilize in its arming/disarming decision making include a weight on wheel signal (or weight off wheel signal) which typically originates from the aircraft's landing gear system. Other input signals typically include: the speed of the left and right wheels; the thrust lever angle position which comes from the thrust lever position commanded by the pilot or co-pilot; the true air speed coming from the air data system; and a current height of the aircraft 10 above the ground usually provided by a radio altimeter. Some of these individual aircraft input signals 34 may be consolidated together for use by the GLD Arming logic 60. Further, the validity of each of various one or more of the aircraft input signals 34 may be used in determining whether that particular signal value should be used (i.e., used if valid, not used if invalid). Still further, the validity of certain ones of the aircraft input signals 34 may be consolidated with the then current actual value of these certain aircraft input signals 34 and such consolidated signals are used by the GLD Arming logic 60.

The GLD Arming logic 60 may use the current values of various ones of these aircraft input signals 34 and compare them to pre-programmed threshold values in making decisions as to whether to arm the GLD Logic 32 or to disarm the GLD Logic 32. For example, the wheel speed information may be compared to certain set threshold values in knots to assist the GLD Arming logic 60 in determining whether or not the aircraft 10 is taking off. Also, the GLD Arming logic 60 may utilize various amounts of confirmation times for some or all of these aircraft input signals 34. That is, the GLD Arming logic 60 may require that a certain input signal 34 be valid for a predetermined period of time (to avoid spurious or transients signals which are not "true" signals), or that an intermediate decision within the logic 60 is valid for a predetermined period of time (i.e. a confirmation time or a persistence time), before accepting that signal or decision as actually being in a logic state that can be utilized to make a further logic decision, and that would ultimately affect whether the GLD Arming logic 60 determines if the GLD Logic 32 should be armed or disarmed. This way, the GLD Arming logic 60 can be made to be robust or immune to spurious transients due, for example, to flight system glitches or aircraft 10 and/or pilot input configurations. An example is that it is possible for the GLD Logic 32 to receive an erroneous signal that the aircraft 10 is on the ground when it is actually in the air in a flight phase. As such, if the GLD Arming logic 60 were to interpret this as a valid condition, then the spoilers 14-22 may be undesirably deployed with the aircraft 10 in-flight. This is a potentially dangerous condition for the aircraft 10 and the GLD Arming logic 60 must be made to reject such a spurious signal and prevent it from possibly harming the aircraft 10.

Another reasons to use confirmation times or persistence times for certain signals is that certain conditions may exist where the signals must be valid for a period of time to account for various external conditions. For example, the aircraft 10 may land on a wet or icy runway where the wheels of the aircraft 10 may not rotate for the first few second after the aircraft 10 lands. This condition is still a valid landing, but the possibility of the wheels not rotating for a few seconds must be taken into account by the GLD Logic 32. Other aircraft input signals 34 are utilized as "backup" in the event that the primary signals used in a particular decision making process are invalid for whatever reason.

Therefore, in light of the foregoing and as discussed hereinabove with respect to embodiments of the present invention wherein the GLD Logic 32 is armed when the aircraft 10 is in-flight or when it is at takeoff, it should be apparent to one of ordinary skill in the art as to the various one or more of the aircraft input signals 34 that should be utilized, along with the associated threshold values and/or confirmation times, respectively, that these input signals 34 should be above or below and/or at a particular value for a predetermined period of time. A similar situation exists for when the GLD Logic 32 is disarmed.

Still referring to FIG. 3, the GLD Extension Commands logic 58 determines when the ground spoilers 14 and/or the multi-function spoilers 16-22 should be activated (i.e., moved into the extended or deployed position) or deactivated (i.e., moved into their stowed or retracted position). The logic 58 performs its functionality in response to the armed/disarmed signal on the line 70 from the GLD Arming logic 60 and also in response to the one or more signals on the lines 52 that originate with the aircraft input signals 34. In other words, the GLD Extension Commands logic 58 uses the GLD Arming logic 60 providing an indication that the GLD Logic 32 is armed to then authorize the activation or deactivation of the spoilers 14-22 by the GLD Extension Commands logic 58.

Similar to the GLD Arming logic 60 discussed in detail hereinabove, the GLD Extension Commands logic 58 uses the current values of various aircraft input signals 34 in its logic decision making process to decide whether or not to deploy or retract the spoilers 14-22. Typically at aircraft takeoff, although armed, the spoilers 14-22 are latched to their deactivation state, as the spoilers are not needed unless the takeoff needs to be stopped for whatever reason.

There is one condition worth noting in which a relatively "light weight" aircraft 10 is in a takeoff mode and the takeoff is rejected, such that the aircraft 10 must be stopped before the aircraft 10 leaves the ground. In this case the ground spoilers 14 must be extended and the associated GLD GS Cmd signal on the line 72 (FIG. 3) needs to have relatively high integrity. In this condition, the GLD GS Cmd signal on the line 72 needs to have a "radio altimeter height" condition that is relatively immune to noise or other conditions that could cause a spurious signal. When there are at least two radio height signals from the radio altimeter, a miscomparison monitor in the GLD Extension Commands logic 58 covers this situation because the radio altimeter signal cannot remain erroneous and valid for more than the confirmation or persistence time. But in the event of only one valid radio height altimeter signal (e.g., a dispatch case) or no more valid radio height signals (e.g., after a miscompare failure), the ground spoiler deployment command condition will still be met when the weight on wheel signal becomes the weight off wheel signal during a maximum period of time and is limited to takeoff.

The consolidation of at least one or both landing gears on an "on-ground" condition to make sure that the full ground lift dump authority occurs when the aircraft is steady. In the case of a relatively light aircraft 10, the weight on wheel signal may be useless, since it cannot detect the gear compression at aircraft touchdown. The multi-function spoiler extension logic 58 relies on a wheel speed detection on both gears combined with either a ground detection by the radio altimeter or a weight on wheel on one gear. Use of a time window of a particular time period allows for the detection of wheel speed on both main gears during landing as well as during takeoff. The time period of the time window allows this logic to be inhibited during takeoff because the wheels are still turning after lift off and the logic would be one single failure from a critical event in case of thrust levers on idle after takeoff.

Thus, the foregoing describes a particular treatment of weight on wheel performance in a relatively light aircraft configuration, considering a failure of the radio altimeter and a rejected takeoff condition.

Figure 4:
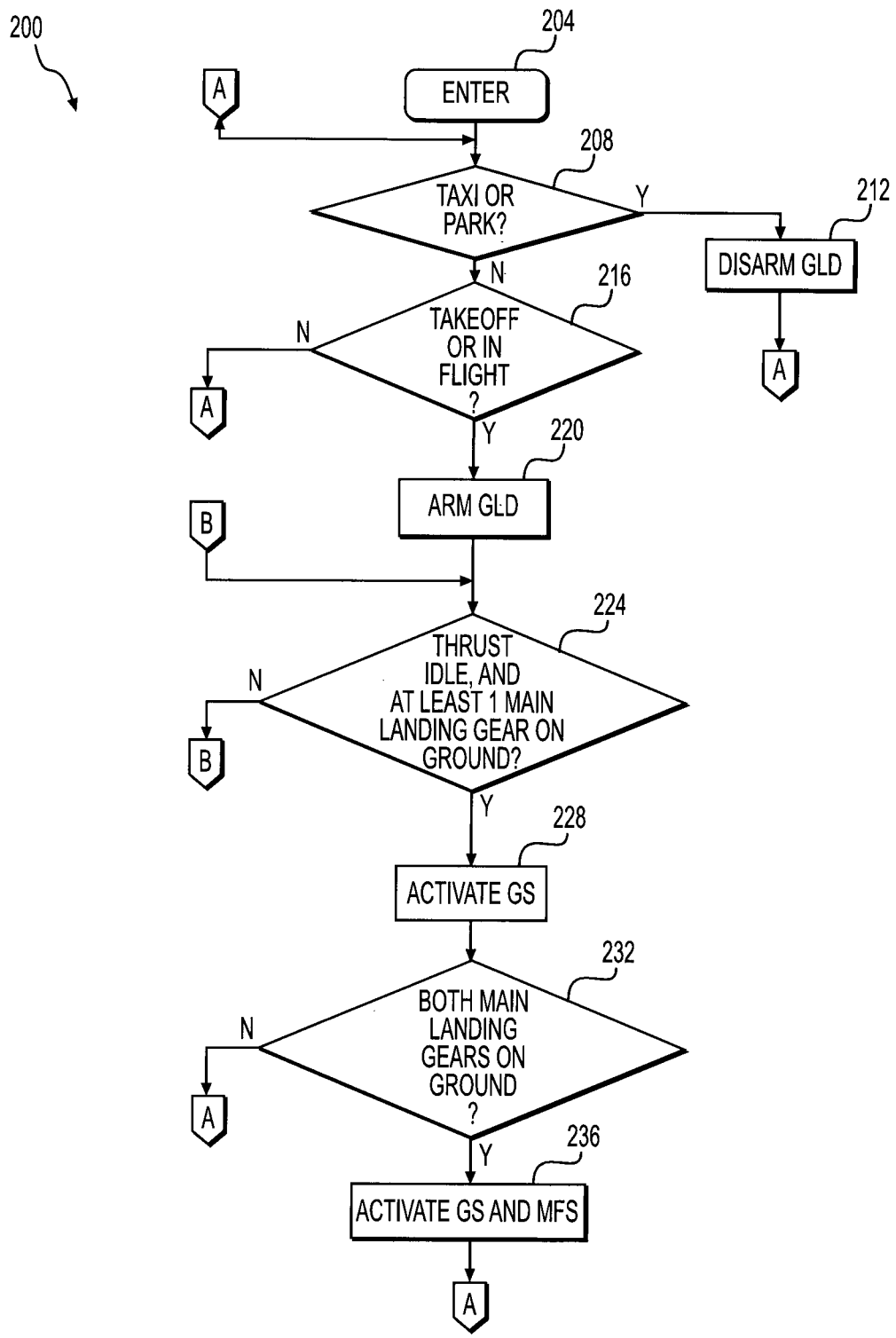
FIG. 4 is a flow chart of steps executed in a method that implements the ground lift dump function logic in accordance with embodiments of the present invention.

Referring to FIG. 4, there illustrated is a is a flow chart of steps executed in a method 200 that implements the ground lift dump function logic 32 in accordance with embodiments of the present invention. The method 200 may, for example, be implemented in software that runs on the flight control computers 30. Other software and/or hardware embodiments of the method 200 are possible in light of the teachings herein. After an enter step 204, a step is executed in which a check is made to see if the aircraft 10 is in a taxi phase or in a park phase. If so, the method 200 then executes a step 212 in which the GLD function is disarmed. The method 200 then branches back to the step 208 that checks for the taxi or park phase of aircraft operation.

If, instead, the aircraft 10 is not in either the taxi phase or the park phase as a result of the step 208, then a step 216 is executed in which a check is made to see if the aircraft 10 is in either a takeoff phase of in-flight phase. If not, the method 200 branches back to the step 208 in which it checks if the aircraft 10 is in the taxi or park phase. If so, the method 200 then executes a step 220 in which it arms the GLD Logic function 32.

The method 200 then checks in a step 224 if the thrust is in an idle position (as indicated by the TLA signal discussed hereinabove) and at least one main landing gear is on the ground. The thrust being in an idle position and at least one main landing gear being on the ground are exemplary aircraft input signals 34 (FIGS. 2 and 3) used in embodiments of the present invention to indicated a rejected takeoff condition of the aircraft 10. If not, then the method 200 returns to the step 224. If so, then a determination has been made that the aircraft 10 is on the ground and as such the method then executes a step 228 in which the ground spoilers 14 are activated (i.e., fully extended).

The method 200 then checks in a step 232 if both main landing gears are on the ground. If so, then the method 200 executes a step 236 that activates both the ground spoilers 14 and the multi-function spoilers 16-22. Both main landing gears being on the ground is an indication that the aircraft has just landed on the ground from being in a flight phase. If not, the method 200 branches back to the step 208 where it checks if the aircraft is in a taxi or park phase.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more non-transitory computer readable medium(s) having computer readable program code embodied thereon. The computer program product may, for example, be executed by a control system, such as, for example, the flight control computer system 30 of FIG. 2.

Any combination of one or more computer readable medium(s) may be utilized. The computer readable medium may be a computer readable signal medium or a non-transitory computer readable storage medium. A non-transitory computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on a computer, such as the flight control computer 30 of FIG. 2.

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer (e.g., the flight control computer system 30 of FIG. 2), other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks This written description uses examples to disclose the invention, including the best mode, and also to enable any person skilled in the art to make and use the invention. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims. All citations referred herein are expressly incorporated herein by reference.

What is claimed is:

1. A flight control system for an aircraft, comprising:
   at least one flight control computer that carries out a ground lift dump function that selectively extends a spoiler located on a wing of the aircraft into an airflow passing over the wing;
   wherein the at least one flight control computer includes arming logic that is responsive to an input signal indicative of an aircraft parameter to automatically arm the ground lift dump function during certain phases of operation of the aircraft; and
   wherein the at least one flight control computer includes spoiler deployment logic that is responsive to an arming signal from the arming logic which indicates that the ground lift function is armed to deploy the spoiler into its extended position within the airflow passing over the wing of the aircraft to assist in stopping the aircraft while the aircraft is on the ground.

2. The flight control system of claim 1, wherein the spoiler comprises at least one of a ground spoiler and a multi-function spoiler.

3. The flight control system of claim 1, wherein the certain phases of aircraft operation in which the ground lift dump function is automatically armed includes an on the ground phase after the aircraft has been in a flight phase.

4. The flight control system of claim 1, wherein the certain phases of aircraft operation in which the ground lift dump function is automatically armed includes a takeoff condition of the aircraft such that the spoiler can be deployed into its extended position to assist in stopping the aircraft if the takeoff has been terminated prior to the aircraft taking off.

5. The flight control system of claim 1, wherein the at least one flight control computer includes arming logic that is responsive to an input signal indicative of the aircraft parameter to automatically disarm the ground lift dump function during certain phases of aircraft operation.

6. The flight control system of claim 5, wherein the certain phases of aircraft operation in which the ground lift dump function is automatically disarmed includes a taxi phase.

7. The flight control system of claim 5, wherein the certain phases of aircraft operation in which the ground lift dump function is automatically disarmed includes a park phase.

8. The flight control system of claim 1, wherein the spoiler deployment logic is also responsive to a signal from a lever in a cockpit in the aircraft, wherein the lever is movable by a pilot in the cockpit.

9. The flight control computer of claim 8, wherein the spoiler deployment logic is responsive to the signal from the lever in the cockpit when the ground lift function is armed to move the spoiler into a position that is proportional to the amount of movement of the lever by the pilot in the cockpit, thereby affecting the amount of lift and drag on the wing of the aircraft.

10. The flight control system of claim 1 wherein the flight control computer comprises a portion of a fly-by-wire type of flight control system for the aircraft.

11. The flight control system of claim 1, wherein the input signal comprises at least one of an aircraft altitude signal indicative of the height of the aircraft above ground, a weight on wheel signal indicative of a weight of the aircraft, and a wheel speed signal indicative of a speed of one or more wheels of the aircraft.

12. The flight control system of claim 1,
    wherein the input signal comprises an aircraft altitude signal indicative of the height of the aircraft above ground, a weight on wheel signal indicative of a weight of the aircraft, and a wheel speed signal indicative of a speed of one or more wheels of the aircraft; and
    wherein when the aircraft altitude signal is invalid and the weight on wheel signal does not give an indication of the weight of the aircraft, the spoiler deployment logic is operable to deploy the spoiler located on the wing in response to the wheel speed signal having a predetermined characteristic.

13. A method for implementing a ground lift dump function within a flight control system for an aircraft, the method comprising:
    checking if the aircraft is in a taxi phase or a park phase and if so, then automatically disarming the ground lift dump function; and
    checking if the aircraft is in one of a takeoff phase and in an in-flight phase and if so, then automatically arming the ground lift dump function.

14. The method of claim 13, wherein automatically arming the ground lift dump function is based on at least one of an aircraft altitude signal indicative of the height of the aircraft above ground, a weight on wheel signal indicative of a weight of the aircraft, and a wheel speed signal indicative of a speed of one or more wheels of the aircraft.

15. The method of claim 14, wherein when the aircraft altitude signal is invalid and the weight on wheel signal does not give an indication of the weight of the aircraft, deploying a spoiler located on a wing of the aircraft in response to the wheel speed signal having a predetermined characteristic.

16. The method of claim 13, further comprising checking if a thrust command is in an idle condition and at least one main landing gear on the aircraft is on the ground and if so, then activating at least two ground lift spoilers on the aircraft into a fully deployed condition.

17. The method of claim 13, further comprising checking if both of the main landing gears on the aircraft are on the ground and if so, then activating the at least two ground spoilers into the fully deployed condition and also activating at least some of a plurality of multi-function spoilers into a fully deployed condition.

18. The method of claim 13, wherein if a result of the checking if the aircraft is in a takeoff phase or in an in-flight phase indicates that the aircraft is not in a takeoff phase or is not in an in-flight phase, then the method branching back to the step of checking if the aircraft is in a taxi phase or a park phase.

19. The method of claim 13, wherein after automatically arming the ground lift dump function the method branches back to the step of checking if the aircraft is in a taxi phase or a park phase.

20. The method of claim 16, wherein if a result of the checking if a thrust command is in an idle condition and at least one main landing gear on the aircraft is on the ground indicates that the thrust command is not in an idle condition and that the at least one main landing gear is not on the ground, then the method branching back to the step of checking if a thrust command is in an idle condition and at least one main landing gear on the aircraft is on the ground.

21. The method of claim 17, wherein if as a result of the step of checking if both of the main landing gears on the aircraft are on the ground indicates that both of the main landing gears are not on the ground, then the method branching back to the step of checking if the aircraft is in a taxi phase or a park phase.

22. The method of claim 17, wherein after the step of activating the at least two ground spoilers into the fully deployed condition and also activating at least some of a plurality of multi-function spoilers into a fully deployed condition, the method branching back to the step of checking if the aircraft is in a taxi phase or a park phase.

23. A computer program product for implementing a ground lift dump function with an aircraft flight control system, the computer program product comprising a non-transitory computer readable storage medium having program code embodied therewith, the program code readable/executable by a computer, processor or logic circuit to perform a method comprising:

checking if the aircraft is in a taxi phase or a park phase and if so, then automatically disarming the ground lift dump function; and checking if the aircraft is in a takeoff phase or in an in-flight phase and if so, then automatically arming the ground lift dump function.

24. The computer program product of claim 23, wherein automatically arming the ground lift dump function is based on at least one of an aircraft altitude signal indicative of the height of the aircraft above ground, a weight on wheel signal indicative of a weight of the aircraft, and a wheel speed signal indicative of a speed of one or more wheels of the aircraft.

25. The computer program product of claim 24, wherein when the aircraft altitude signal is invalid and the weight on wheel signal does not give an indication of the weight of the aircraft, deploying a spoiler located on a wing of the aircraft in response to the wheel speed signal having a predetermined characteristic.

26. The computer program product of claim 23, further comprising checking if a thrust command is in an idle condition and at least one main landing gear on the aircraft is on the ground and if so, then activating at least two ground lift spoilers on the aircraft into a fully deployed condition.

27. The computer program product of claim 23, further comprising checking if both of the main landing gears on the aircraft are on the ground and if so, then activating the at least two ground spoilers into the fully deployed condition and also activating at least some of a plurality of multi-function spoilers into a fully deployed condition.

28. The computer program product of claim 23, wherein if a result of the checking if the aircraft is in a takeoff phase or in an in-flight phase indicates that the aircraft is not in a takeoff phase or is not in an in-flight phase, then the method branching back to the step of checking if the aircraft is in a taxi phase or a park phase.

29. The computer program product of claim 23, wherein after automatically arming the ground lift dump function the method branches back to the step of checking if the aircraft is in a taxi phase or a park phase.

30. The computer program product of claim 26, wherein if a result of the checking if a thrust command is in an idle condition and at least one main landing gear on the aircraft is on the ground indicates that the thrust command is not in an idle condition and that the at least one main landing gear is not on the ground, then the method branching back to the step of checking if a thrust command is in an idle condition and at least one main landing gear on the aircraft is on the ground.

31. The computer program product of claim 27, wherein if as a result of the step of checking if both of the main landing gears on the aircraft are on the ground indicates that both of the main landing gears are not on the ground, then the method branching back to the step of checking if the aircraft is in a taxi phase or a park phase.

32. The computer program product of claim 27, wherein after the step of activating the at least two ground spoilers into the fully deployed condition and also activating at least some of a plurality of multi-function spoilers into a fully deployed condition, the method branching back to the step of checking if the aircraft is in a taxi phase or a park phase.

* * * * *